US009252634B2

(12) United States Patent
Kondou et al.

(10) Patent No.: US 9,252,634 B2
(45) Date of Patent: Feb. 2, 2016

(54) SYNCHRONOUS MOTOR

(71) Applicant: DENSO CORPORATION, Kariya, Aichi-pref. (JP)

(72) Inventors: Keiji Kondou, Toyota (JP); Shin Kusase, Obu (JP); Takeo Maekawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 327 days.

(21) Appl. No.: 13/737,377

(22) Filed: Jan. 9, 2013

(65) Prior Publication Data

US 2013/0264895 A1 Oct. 10, 2013

(30) Foreign Application Priority Data

Apr. 10, 2012 (JP) .................................. 2012-089176

(51) Int. Cl.
*H02K 1/06* (2006.01)
*H02K 21/12* (2006.01)
*H02K 21/14* (2006.01)
*H02K 16/04* (2006.01)

(52) U.S. Cl.
CPC .................. *H02K 1/06* (2013.01); *H02K 16/04* (2013.01); *H02K 21/12* (2013.01); *H02K 21/14* (2013.01); *H02K 2201/03* (2013.01); *H02K 2213/03* (2013.01)

(58) Field of Classification Search
CPC ......... H02K 16/04; H02K 1/06; H02K 21/12; H02K 21/14; H02K 2201/03; H02K 2213/03
USPC .............................. 310/46, 112, 101, 113, 181
See application file for complete search history.

(56) References Cited

U.S. PATENT DOCUMENTS

| 7,567,006 B2 * | 7/2009 | Ichiyama ...................... 310/191 |
| 2003/0178909 A1 * | 9/2003 | Kusase ................... H02K 19/22 310/254.1 |
| 2008/0129135 A1 * | 6/2008 | Chen et al. ............... 310/156.35 |
| 2009/0021089 A1 * | 1/2009 | Nashiki ........................... 310/46 |
| 2010/0171385 A1 * | 7/2010 | Sakai et al. .............. 310/156.43 |
| 2010/0207480 A1 * | 8/2010 | Reutlinger .................... 310/181 |
| 2011/0084567 A1 * | 4/2011 | Ichiyama ...................... 310/181 |

(Continued)

FOREIGN PATENT DOCUMENTS

| EP | 2413482 A1 * | 2/2012 |
| JP | 2000-102198 | 4/2000 |

(Continued)

OTHER PUBLICATIONS

Translation of foreign document EP 2413482 A1 (Year: 2012).*

(Continued)

*Primary Examiner* — Alex W Mok
(74) *Attorney, Agent, or Firm* — Nixon & Vanderhye P.C.

(57) ABSTRACT

The synchronous motor includes a rotor including a rotor core constituted of segment poles disposed in a ring and a stator including a stator core disposed radially outward or inward of the rotor with a gap therebetween and a multiple-phase stator winding wound on the stator core. Each of the segment poles has a magnetic salient pole characteristic. The rotor is rotated in synchronization with a rotating magnetic field generated when the multiple-phase stator winding is applied with a multiple-phase AC voltage. The lamination thickness as an axial length of the stator core is shorter than the lamination thickness as an axial length of the rotor core.

6 Claims, 10 Drawing Sheets

(56) References Cited

U.S. PATENT DOCUMENTS

2011/0285238 A1    11/2011   Kusase et al.
2012/0187794 A1*   7/2012    Inoue et al. .................. 310/181
2013/0113333 A1*   5/2013    Kondou et al. ........ 310/216.094

FOREIGN PATENT DOCUMENTS

| JP | 2004-260970 | 9/2004 |
| JP | 2008-295282 | 12/2008 |
| JP | 2009-027842 | 2/2009 |
| JP | 2009-219312 | 9/2009 |
| JP | 2011-244643 | 12/2011 |

OTHER PUBLICATIONS

Office Action (2 pages) dated Mar. 11, 2014, issued in corresponding Japanese Application No. 2012-089176 and English translation (3 pages).

* cited by examiner

SYNCHRONOUS MOTOR

This application claims priority to Japanese Patent Application No. 2012-89176 filed on Apr. 10, 2012, the entire contents of which are hereby incorporated by reference.

BACKGROUND OF THE INVENTION

1. Field of the Invention

The present invention relates to a synchronous motor which can be used as a drive motor of an industrial machine and a driving motor of a vehicle, particularly a hybrid vehicle.

2. Description of Related Art

As a compact and high output motor, there is known the so-called IPM motor (Interior Permanent Magnet Motor) which uses reluctance torque derived from attraction force of its core in addition to magnet torque. Generally, the IPM motor achieves a high output density by generating a large magnet torque using high-performance magnets or a large amount of magnets, and utilizing the reluctance torque accessorily. Meanwhile, when the IPM motor is used as a driving motor of a vehicle, it is required to be low in manufacturing cost, in addition to having a high output density. As a motor satisfying such requirements, there is known the so-called auxiliary magnet assisted reluctance motor which can generate a high reluctance torque using a small amount of magnets by ingenuity in the shape of its core, in contrast to conventional IPM motors which are designed giving great importance to the magnet torque. For example, refer to Japanese Patent Application Laid-open No. 2008-295282.

Generally, the reluctance torque T is given by the following equation (1).

$T=(Lq-Ld) \times Id \cdot Iq$ ... (1) where Lq is a q-axis inductance, Iq is a q-axis current, Ld is a d-axis inductance, and Id is a d-axis current.

The equation (1) shows that the reluctance torque increases with the increase of the inductance difference between the d-axis and the q-axis which are perpendicular to each other. The above patent document describes that the d-axis inductance Ld is made smaller by providing a large concave portion (magnetic gap) in the d-axis to increase the inductance difference as much as possible. However, the motor described in the above patent document has a problem as described in the following.

The d-axis inductance Ld is very small, and accordingly most of the magnetic flux passes through the q-axis. Accordingly, the ratio of the cross-sectional area of the magnetic path of the rotor (that is, the product of the circumferential width of one stator tooth, the number of teeth for one stator pole and the lamination thickness of the core) to the cross-sectional area of the q-axis flux passage of the rotor (that is, the product of the circumferential width of the q-axis for one rotor pole and the lamination thickness of the core) is large. Hence, when the stator winding is excited, there occurs a lot of inefficient flux which not only does not contribute to the output torque, but also causes iron loss in the stator core.

SUMMARY

An exemplary embodiment provides a synchronous motor including:

a rotor including a rotor core constituted of segment poles disposed in a ring, each of the segment poles having a magnetic salient pole characteristic; and a stator including a stator core disposed radially outward or inward of the rotor with a gap therebetween and a multiple-phase stator winding wound on the stator core, the rotor being rotated in synchronization with a rotating magnetic field generated when the multiple-phase stator winding is applied with a multiple-phase AC voltage, wherein a lamination thickness as an axial length of the stator core is shorter than a lamination thickness as an axial length of the rotor core.

Another exemplary embodiment provides a synchronous motor including:

a rotor including a rotor core constituted of segment poles disposed in a ring, each of the segment poles having a magnetic salient pole characteristic;

an outer stator including an outer stator core disposed radially outward of the rotor with a gap therebetween, and a multiple-phase outer stator winding wound on the outer stator core; and an inner stator including an inner stator core disposed radially inward of the rotor with a gap therebetween, and a multiple-phase inner stator winding wound on the inner stator core, the rotor being rotated in synchronization with a rotating magnetic field generated when the multiple-phase outer stator winding and the multiple-phase inner stator winding are applied with a multiple-phase AC voltage, wherein a lamination thickness as an axial length of the outer stator core and a lamination thickness as an axial length of the inner stator core are shorter than a lamination thickness as an axial length of the rotor core.

According to the exemplary embodiments, there is provide a synchronous motor having less stator core loss and a high output power density.

Other advantages and features of the invention will become apparent from the following description including the drawings and claims.

PREFERRED EMBODIMENTS OF THE INVENTION

First Embodiment

Figure 1:
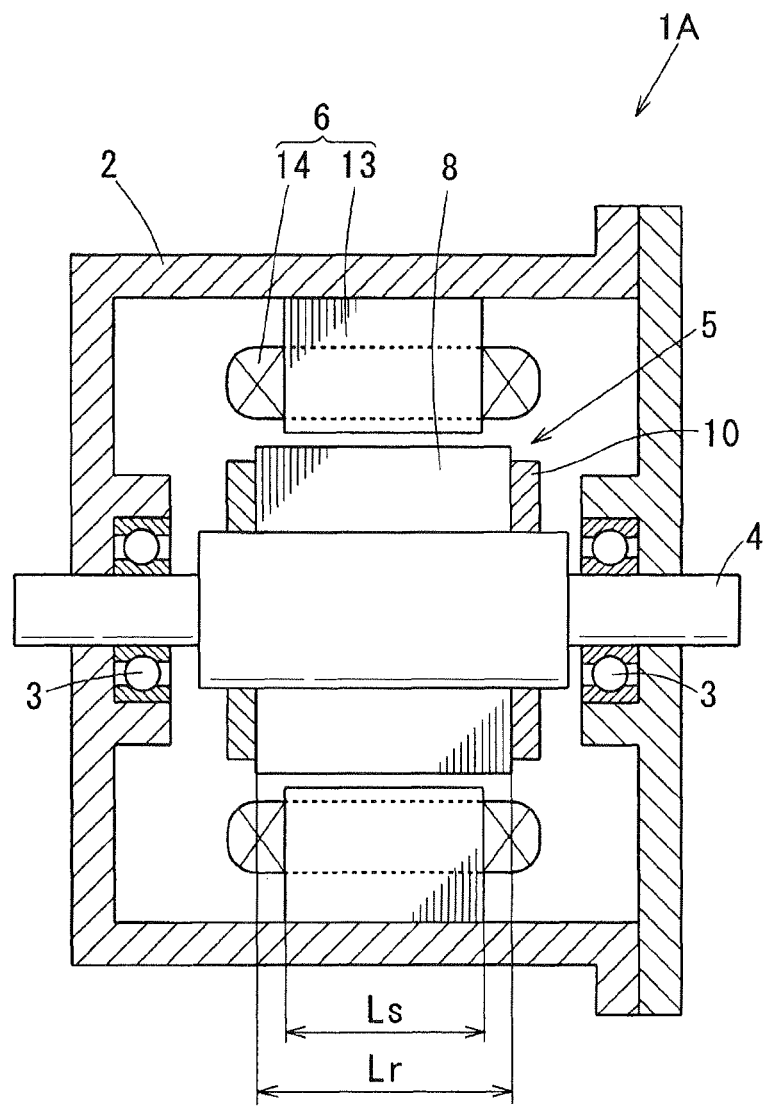
FIG. 1 is a longitudinal cross-section of a synchronous motor according to a first embodiment of the invention.

FIG. 1 is a longitudinal cross-section of a synchronous motor 1A according to a first embodiment of the invention. As shown in FIG. 1, the synchronous motor 1A includes a rotor shaft 4 rotatably supported by a motor housing 2 through a pair of bearings 3, a rotor 5 supported by the rotor shaft 4, and a stator 6 disposed radially outward of the rotor 5 with a gap therebetween and fixed to the inner periphery of the motor housing 2. The rotor 5, which is fitted and fixed to the outer periphery of the rotor shaft 4, includes a rotor core 8 constituted of a plurality of segment poles 7 arranged in a ring (see FIG. 2), a plurality of permanent magnets 9 and a pair of rotor end plates 10 disposed at both axial ends of the rotor 5. The permanent magnets 9 are disposed between respective circumferentially adjacent two of the segment poles 7 (see FIG. 2).

Figure 2:
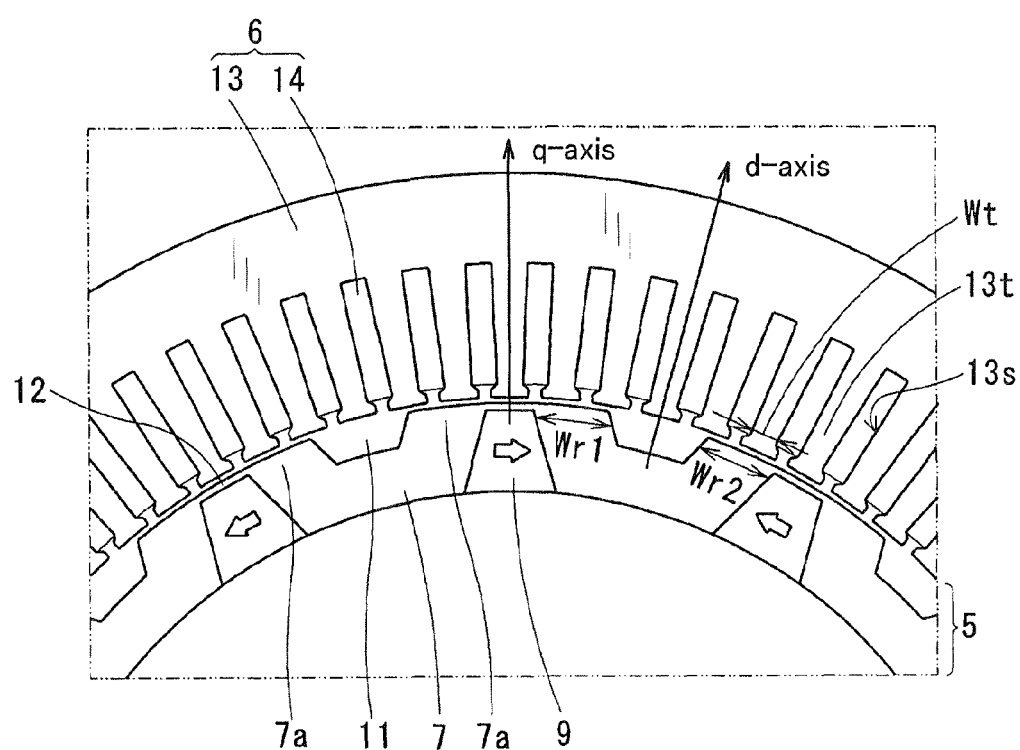
FIG. 2 is a cross-sectional view of the magnetic circuit of the synchronous motor according to the first embodiment.

The segment poles 7 are formed by laminating electromagnetic steel plates punched in a predetermined segment pole shape. The lamination thickness is the axial length Lr of the rotor core 8 (see FIG. 1). As shown in FIG. 2, the segment pole 7 is formed with a concave portion 11 depressed toward the opposite stator side (radially inner side of the rotor 5) at the circumferential center of the radially outer surface thereof facing the stator 6. Further, the segment pole 7 is formed with salient pole portions 7a which extend to the radially outer surface of the rotor 5 to form entrances of magnetic flux at both sides of the concave portion 11. A magnetic gap is provided between the radially outer surface of the salient pole portions 7a and the radially inner surface of the stator 6. Both circumferential sides of the segment pole 7 are formed in a tapered shape such that the circumferential width gradually increases in the direction from the radially inner end toward the radially outer end thereof.

Respective adjacent two of the segment poles 7 are connected to each other through an outer bridge 12 so that the segment poles 7 are connected in a ring. The outer bridges 12 are formed so as to circumferentially extend between respective adjacent two of the segment poles 7 such that their radially outermost surfaces are flush with the radially outermost surfaces of these segment poles 7. The thickness of the outer bridges 12 is as thin as the order of 1 mm. Accordingly, between respective adjacent two of the segment poles 7, there are formed inter-pole spaces of a trapezoidal shape closed by the outer bridges 12 at their radially outer peripheries. Incidentally, although the segment poles 7 are integrally connected in a ring by the outer bridges 12 in this embodiment, they may be formed separately.

The permanent magnets 9 are disposed in the inter-pole spaces between respective adjacent two of the segment poles 7, and restrained from moving in the circumferential and radial directions. As shown in FIG. 2, the permanent magnets 9 are magnetized in the circumferential direction such that respective circumferentially adjacent two of the permanent magnets 9 which are opposite to each other across from the segment pole 7 are magnetized in the circumferentially opposite directions as shown by the arrows. The rotor end plates 10, which are made of non-magnetic material such as aluminum, are formed in a disc shape. The rotor end plates 10 are fastened to each other by fastening pins penetrating through the rotor 5 in the axial direction to hold the rotor core 8 therebetween and prevent the permanent magnets 9 from moving in the axial direction.

Figure 3:
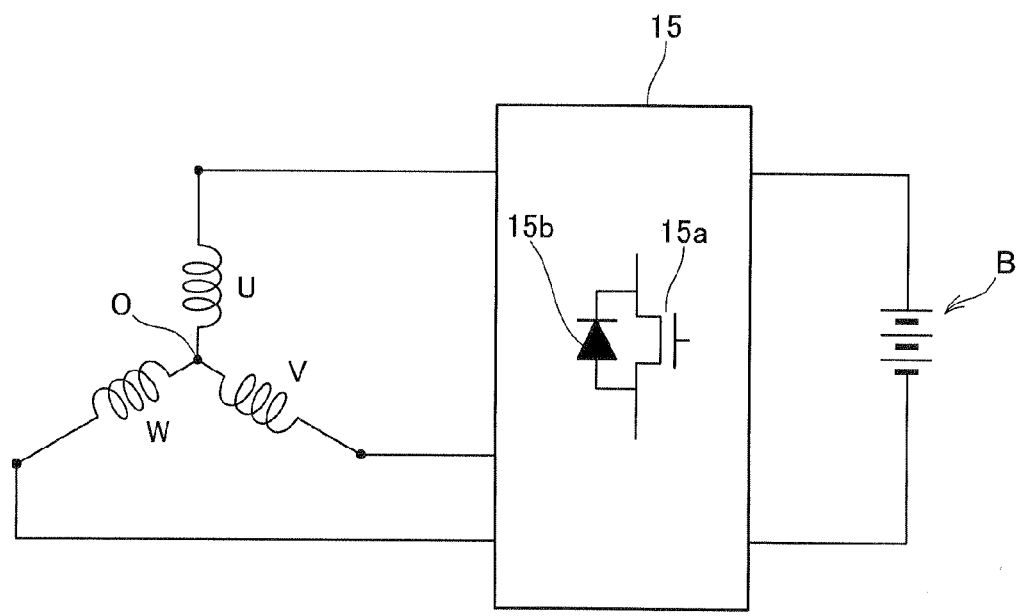
FIG. 3 is a wiring diagram of the stator winding of the synchronous motor according to the first embodiment.

As shown in FIG. 2, the stator 6 is constituted of an annular stator core 13 including a plurality of slots 13a and teeth 13t, and a stator winding 14 (see FIG. 1) wound on the stator core 13 passing through the slots 13s. The stator core 13 is formed by laminating electromagnetic steel plates punched in a predetermined shape by a press. The slots 13s are evenly spaced along the inner periphery of the stator core 13. The teeth 13t are formed between respective circumferentially adjacent slots 13s. As shown in FIG. 3, the stator winding 14 is constituted of three phase windings (U-phase, V-phase and W-phase windings) which are star-connected to one another. The end opposite to the neutral point of each phase winding is connected to the inverter 15.

Figure 4:
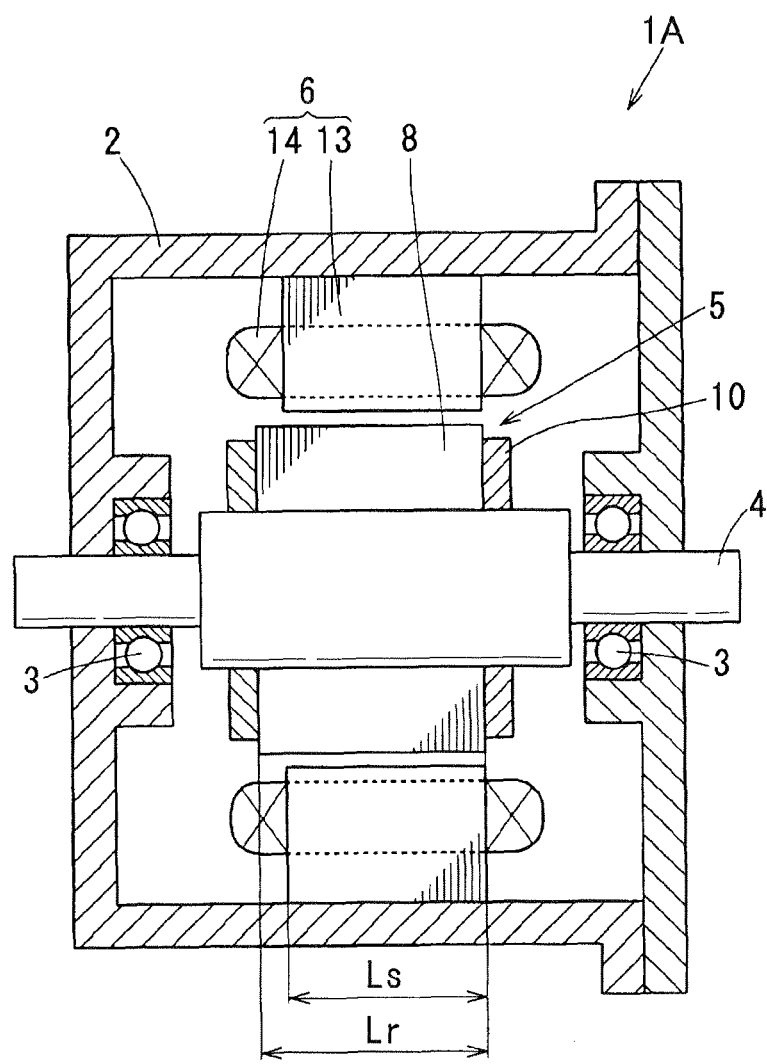
FIG. 4 is a longitudinal cross-section of a modification of the synchronous motor according to the first embodiment of the invention.

The inverter 15 converts DC power received from a DC power source B into AC power used for exciting the stator winding 14. As schematically shown in FIG. 3, the inverter 15 includes transistors 15a inversely parallel-connected with diodes 15b, respectively. The inverter 15 is controlled by a not-shown ECU (Electronic Control Unit) in accordance with a detection signal outputted from a not-shown sensor for detecting the rotational position of the rotor 5. As shown in FIG. 1, the axial length Ls or the lamination thickness of the stator core 13 is shorter the axial length or the lamination thickness Lr of the rotor core 8. In FIG. 1, it is shown that the position of the center of the rotor core 8 in the axial direction coincides with that of the stator core 13. However, they may be shifted from each other in the axial direction as shown in FIG. 4.

Next, the operation of the synchronous motor 1A having the above described structure is explained. In this embodiment, the center axis of the segment pole 7 which is the magnetic pole of the rotor 5, that is, the axis passing through the circumferential center of the segment pole 7 is defined as a d-axis, and the axis electrically perpendicular to this d-axis, that is, the axis passing through the middle between the adjacent segment poles 7 is defined as a q-axis. When the inverter 15 excites the stator winding 14 such that the center of a current distribution is located at a position slightly deviated from the q-axis in the circumferential direction, the segment pole 7 is magnetically attracted toward the center of the current distribution. That is, a reluctance torque is generated. Further, since the segment pole 7 is magnetized by the permanent magnets 9 adjacent thereto, the center of the segment pole 7 is attracted toward the center of the current distribution. That is, a magnet torque is generated. As a result, the rotor 5 is rotated by the action of the reluctance torque and the magnet torque.

The first embodiment described above provides the following advantages. The synchronous motor 1A is formed with the concave portion 11 at the d-axis for each segment pole 7. Accordingly, the magnetic gap of the synchronous motor 1A is large at the d-axis. Further, the permanent magnets 9 having a low magnetic permeability are disposed between respective circumferentially adjacent two of the segment poles 7, and accordingly the magnetic resistance of the d-axis magnetic path is large. On the other hand, since the segment poles 7 constituting the q-axis magnetic path are made of electromagnetic steel plates having a low magnetic resistance, the so-called inverse salient-pole structure where the d-axis inductance Ld is smaller than the q-axis inductance Lq is provided. Hence, it is possible to greatly increase the reluctance torque by making large the difference between the d-axis inductance Ld and the q-axis inductance Lq.

The axial length Ls of the stator core 13 is made shorter than the axial length Lr of the rotor core 8 to reduce the ratio of the effective magnetic path cross-sectional area of the stator core 13 to the effective cross-sectional area of the salient pole portion 7a which is the effective q-axis magnetic path cross-sectional area of the rotor 5, compared to conventional synchronous motors in which the above ratio is excessive. Here, the effective q-axis magnetic path cross-sectional area (the effective cross-sectional area of the salient pole portion 7a) of the rotor 5 is the product of the q-axis circumferential width (Wr1+Wr2) per one rotor magnetic pole and the lamination thickness (the axial length Lr) of the rotor core 8. The effective magnetic path cross-sectional area of the stator core 13 is the product of the circumferential width Wt of one tooth 13t, the number of the teeth 13t per one stator pole and the lamination thickness (the axial length Ls) of the stator core 13. Hence, since generation of inefficient flux not contributing to the output torque can be suppressed, and iron loss in the stator core 13 can be reduced, the output density can be increased. Further, since the axial length of the synchronous motor 1A can be reduced by reducing the axial length Ls (lamination thickness) of the stator core 13, the synchronous motor 1A can be used as a compact and high output motor.

Next, second to fourth embodiments of the invention are described. In those embodiments, the parts which are the same as or equivalent to those of the first embodiment are denoted by the same reference numerals or characters.

Second Embodiment

Figure 5:
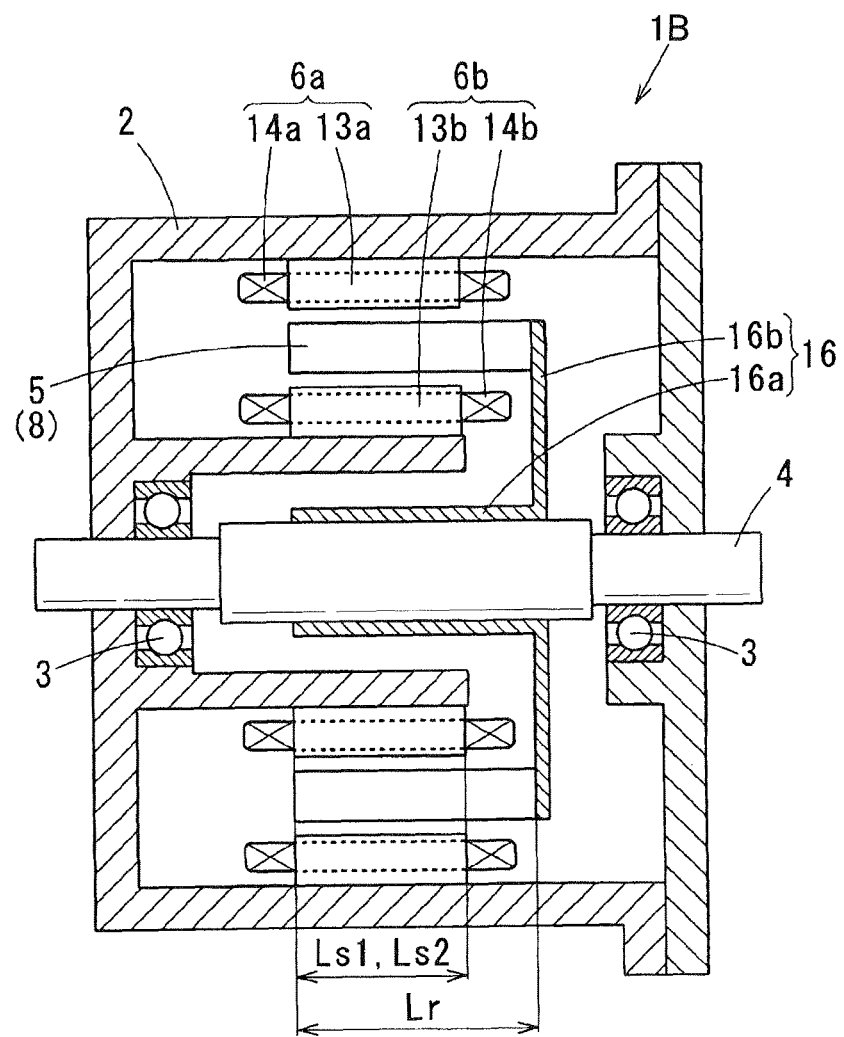
FIG. 5 is a longitudinal cross-section of a synchronous motor according to a second embodiment of the invention.

As shown in FIG. 5, a synchronous motor 1B according to a second embodiment of the invention is a double stator synchronous motor including an outer stator 6a disposed radially outward of the rotor 5 with a gap therebetween and an inner stator 6b disposed radially inward of the rotor 5 with a gap therebetween. The rotor is supported by the rotor shaft 4 through a rotor holding member 16. The rotor holding member 16, which is made of non-magnetic SUS material, for example, includes a cylinder portion 16a fitted and fixed to the outer periphery of the rotor shaft 4, and a disc portion 16b extending radially outward from one axial end of the cylinder portion 16a. The rotor 5 is fixed to the disc portion 16b on the side of one axial end thereof.

Figure 6:
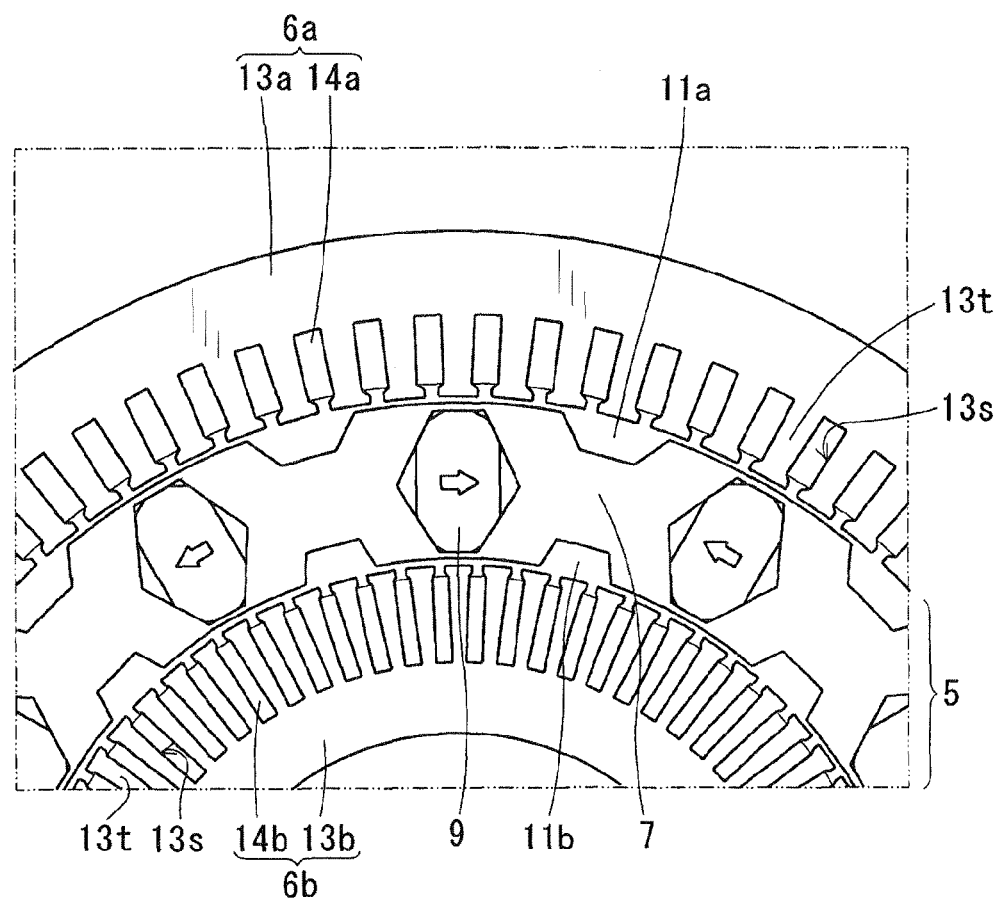
FIG. 6 is a cross-sectional view of the magnetic circuit of the synchronous motor according to the second embodiment.

As shown in FIG. 6, each of the segment poles 7 constituting the magnetic poles of the rotor 5 is formed with an outer concave portion 11a depressed radially inward of the rotor 5 at the circumferential center of the radially outer surface thereof facing the outer stator 6a, and an inner concave portion 11b depressed radially outward of the rotor 5 at the circumferential center of the radially inner surface thereof facing the inner stator 6b. Like the stator 6 in the first embodiment, the outer stator 6a is constituted an outer stator core 13a formed by laminating electromagnetic steel plates, and a three-phase winding 14a including U-phase, V-phase and W-phase windings which are star-connected to one another. Likewise, the inner stator 6b is constituted an inner stator core 13b formed by laminating electromagnetic steel plates, and a three-phase winding 14b including X-phase, Y-phase and Z-phase windings which are star-connected to one another.

Figure 7:
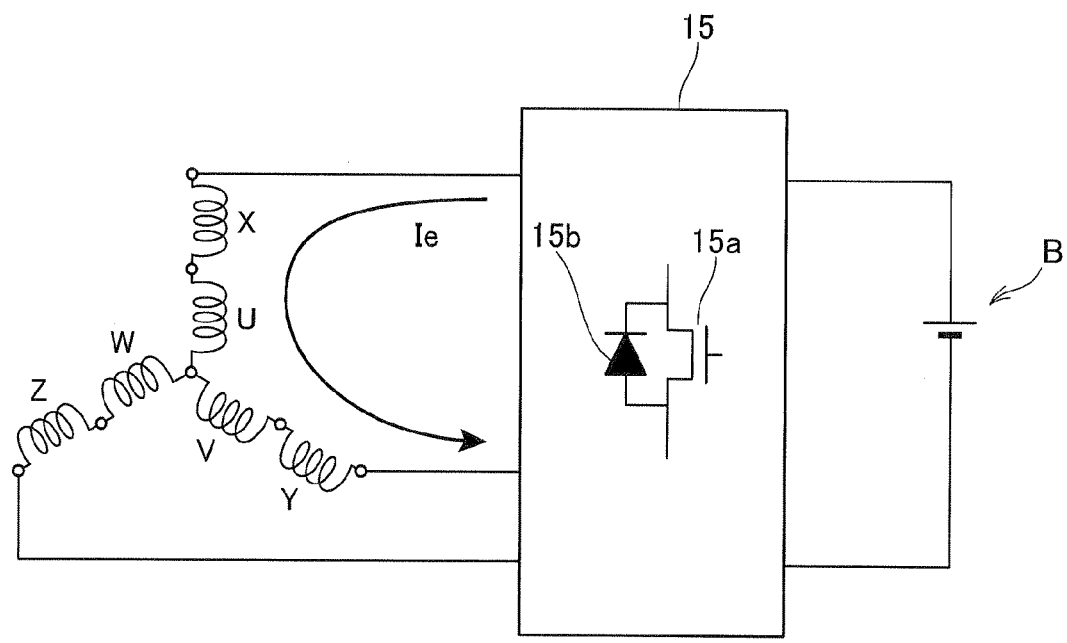
FIG. 7 is a wiring diagram of the stator winding of the synchronous motor according to the second embodiment.

The slots 13s formed in the outer stator core 13a and the slots 13s formed in the inner stator core 13b are the same in number. As shown in FIG. 7, the phase windings of the outer stator winding 14a are series-connected to the corresponding phase windings of the inner stator winding 14b, respectively. The outer stator winding 14a and the inner stator winding 14b are wound such that the magnetmotive forces generated by them when they are supplied with an excitation current Ie from the inverter 15 are the same in magnitude, and they generate the same magnetic polarity at the same circumferential position.

Figure 8:
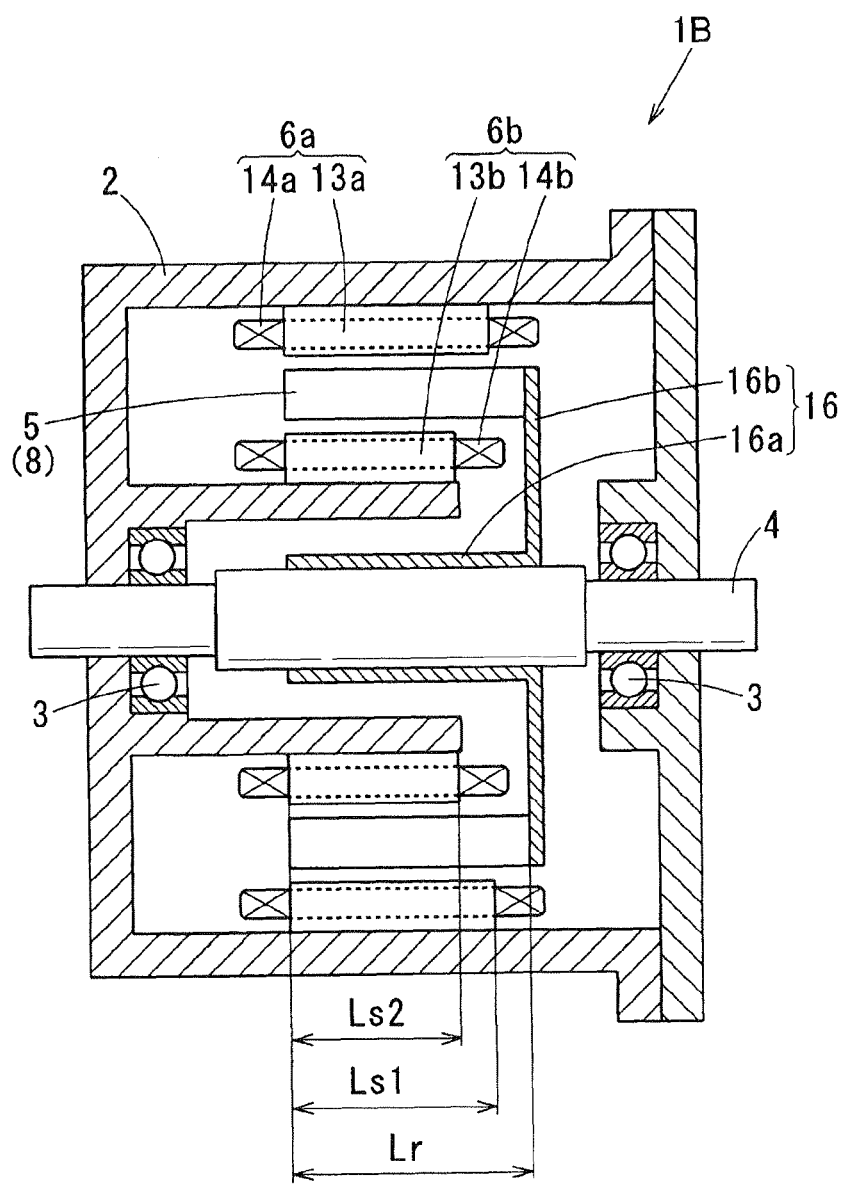
FIG. 8 is a longitudinal cross-section of a modification of the synchronous motor according to the second embodiment of the invention.

Like in the synchronous motor 1A according to the first embodiment, in the synchronous motor 1B according to the second embodiment, the axial length Ls1 of the outer stator core 13a and the axial length Ls2 of the inner stator core 13b are made shorter than the axial length Lr of the rotor core 8. In the second embodiment, the axial length Ls1 of the outer stator core 13a is equal to the axial length Ls2 of the inner stator core 13b as shown in FIG. 5. However, they do not necessarily have to be equal to each other. For example, as shown in FIG. 8, the axial length Ls1 of the outer stator core 13a may be longer than the axial length Ls2 of the inner stator core 13b within the range not exceeding the axial length Lr of the rotor core 8.

Also according to the second embodiment, since generation of inefficient flux not contributing to the output torque can be suppressed, and iron losses in the stator cores 13a and 13b can be reduced by making the axial length Ls1 of the outer stator core 13a and the axial length Ls2 of the inner stator core 13b shorter than the axial length Lr of the rotor core 8, the output density can be increased. Further, since the axial length of the synchronous motor 1B can be reduced, also the synchronous motor 1B can be used as a compact and high output motor.

Third Embodiment

Figure 9:
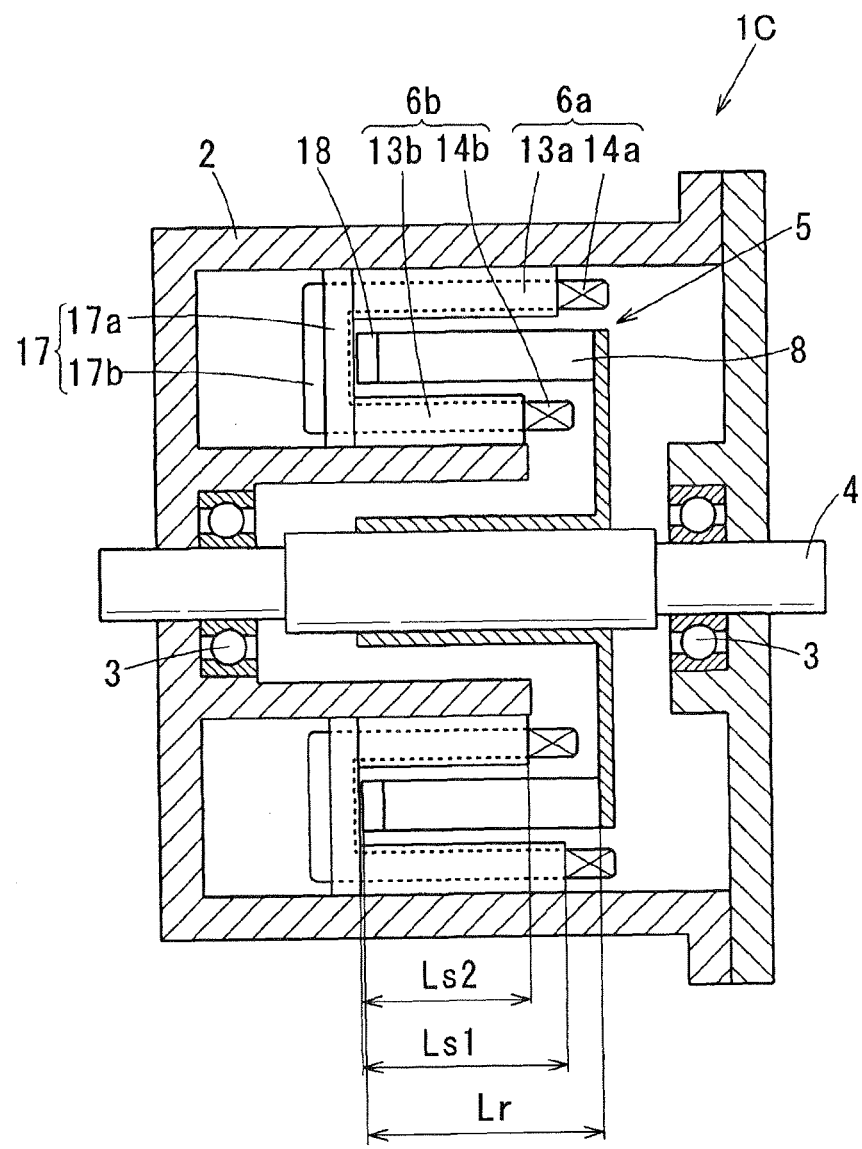
FIG. 9 is a longitudinal cross-section of a synchronous motor according to a third embodiment of the invention.

As shown in FIG. 9, a synchronous motor 1C according to a third embodiment of the invention is a multiple gap synchronous motor including, in addition to the outer stator 6a and the inner stator 6b, a lateral stator 17 disposed opposite to the other axial end (the opposite disc end) of the rotor 5. The rotor 5 used in the synchronous motor 1C additionally includes an end surface core 18 on the opposite disc side. The end surface core 18 is fixed to the disc portion 16b by fixing members such as rivets together with the rotor core 8 constituted of the segment poles 7. The end surface core 18 may have the structure as described in Japanese Patent Application No. 2011-249867.

The lateral stator 17 is constituted of a lateral core 17a coupled to the outer stator core 13a and the inner stator core 13b, and a lateral coil 17b wound on the lateral core 17a. The lateral core 17a is formed with slots (not shown) for accommodating the lateral coil 17b at its surface which faces the end surface core 18 of the rotor 5, and is connected to the axial end surface of the outer stator core 13a at the radially outer periphery thereof and to the axial end surface of the inner stator core 13b at the radially inner periphery thereof. The slots of the lateral core 17a are formed so as to continue to the slots of the outer stator core 13a and the slots of the inner stator core 13b. The lateral coil 17b is formed by connecting the outer stator winding 14a and the inner stator winding 14b in C-shape in cross section.

Also in the synchronous motor 1C according to the third embodiment, the axial length Ls1 (lamination thickness) of the outer stator core 13a and the axial length Ls2 (lamination thickness) of the inner stator core 13b are made shorter than the axial length Lr (lamination thickness) of the rotor core 8. Accordingly, according to the third embodiment, since generation of inefficient flux not contributing to the output torque can be suppressed, and iron losses in the outer stator core 13a and the inner stator core 13b can be reduced, the output density can be increased as in the case of the second embodiment. Further, since a magnetic gap is provided at each of the radially outside, radially inside and axially end surface side of the rotor 5, a compact and even higher output motor can be provided.

Fourth Embodiment

Figure 10:
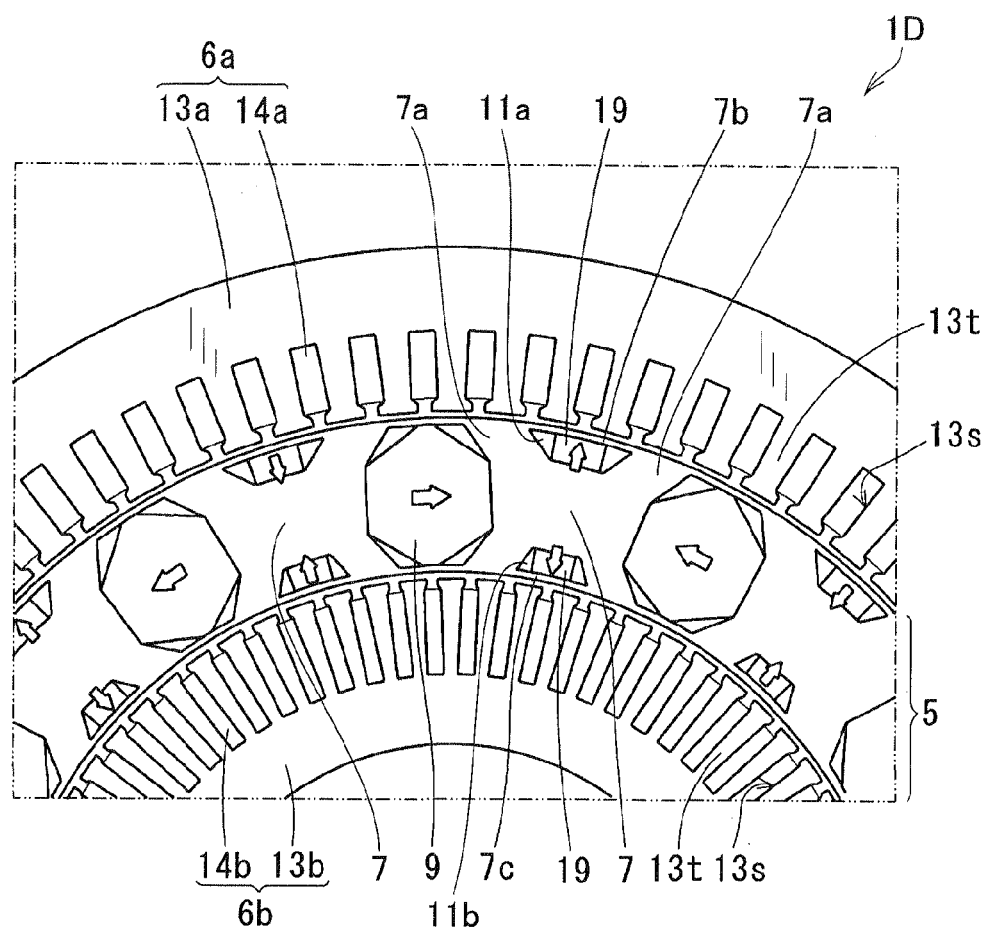
FIG. 10 is a cross-sectional view of the magnetic circuit of a synchronous motor according to a fourth embodiment of the invention.

As shown in FIG. 10, a synchronous motor 1D according to a fourth embodiment includes permanent magnets 19 disposed in the outer concave portions 11a and the inner concave portions 11b formed in the segment poles 7 of the rotor 5. The permanent magnets 19 are magnetized in the radial direction such that respective circumferentially adjacent two of the permanent magnets 19 are magnetized in opposite directions, and the permanent magnet 19 disposed in the outer concave portion 11a and the permanent magnet 19 disposed in the inner concave portion 11b at the same circumferential position are magnetized in opposite directions. The segment pole 7 is integrally provided with an outer bridge 7b for connecting its salient pole portions 7a along the radially outermost periphery of the rotor 5 and an inner bridge 7c for connecting its salient pole portions 7a along the radially innermost periphery of the rotor 5. These outer and inner bridges 7b and 7c prevent the permanent magnets 19 from falling from the outer and inner concave portions 11a and 11b, respectively.

According to the fourth embodiment, since the permanent magnets 19 having a large magnetic resistance are disposed in the outer and inner concave portions 11a and 11b, the d-axis inductance Ld can be further reduced. Accordingly, since the difference between the d-axis inductance Ld and the q-axis inductance can be further increased, a further large reluctance torque can be obtained. The structure shown in FIG. 10 can be applied to the double stator synchronous motor 1B according to the second embodiment and the multiple gap synchronous motor 1C according to the third embodiment. The single stator synchronous motor 1A according to the first embodiment may be modified such that the permanent magnets 19 are disposed in the concave portions 11 of the segment poles 7.

The synchronous motor 1A according to the first embodiment is an inner-rotor synchronous motor. However, the present invention is applicable to an outer-rotor synchronous motor where the rotor is disposed radially outward of the stator.

The above explained preferred embodiments are exemplary of the invention of the present application which is described solely by the claims appended below. It should be understood that modifications of the preferred embodiments may be made as would occur to one of skill in the art.

What is claimed is:

1. A synchronous motor comprising:
   a rotor including a rotor core constituted of segment poles disposed in a ring, each of the segment poles having a magnetic salient pole characteristic;
   an outer stator including an outer stator core disposed radially outward of the rotor with a gap therebetween, and a multiple-phase outer stator winding wound on the outer stator core; and
   an inner stator including an inner stator core disposed radially inward of the rotor with a gap therebetween, a multiple-phase inner stator winding wound on the inner stator core, a lateral stator including a lateral core disposed opposite to an axial end surface of the rotor, and a lateral stator winding wound on the lateral core,
   the rotor being rotated in synchronization with a rotating magnetic field generated when the multiple-phase outer stator winding and the multiple-phase inner stator winding are applied with a multiple-phase AC voltage,
   wherein
   a lamination thickness as an axial length of the outer stator core and a lamination thickness as an axial length of the inner stator core are shorter than a lamination thickness as an axial length of the rotor core, and
   the outer stator winding, the inner stator winding and the lateral stator winding are formed integrally and disposed continuously with one another.

2. The synchronous motor according to claim 1, wherein the lamination thickness as the axial length of the inner stator core is shorter than the lamination thickness as the axial length of the outer stator core.

3. The synchronous motor according to claim 1, wherein the segment pole is formed with an outer concave portion depressed radially inward of the rotor at a circumferential center of an radially outer surface thereof radially facing the outer stator to provide the magnetic salient pole characteristic, and formed with an inner concave portion depressed radially outward of the rotor at a circumferential center of a radially inner surface thereof radially facing the inner stator to provide the magnetic salient pole characteristic.

4. The synchronous motor according to claim 3, wherein a permanent magnet is disposed in each of the outer and inner concave portions formed in the segment poles.

5. The synchronous motor according to claim 4, wherein a permanent magnet is disposed between each circumferentially adjacent two of the segment poles.

6. The synchronous motor according to claim 1, wherein the lateral core is disposed so as to face an end surface core provided on the axial end surface of the rotor, and the lateral core is connected to an axial end surface of the outer stator core at a radially outer periphery thereof and connected to an axial end surface of the inner stator core at a radially inner periphery thereof.

* * * * *